United States Patent [19]

Hirano et al.

[11] Patent Number: 6,020,433
[45] Date of Patent: *Feb. 1, 2000

[54] ANIONIC ELECTRODEPOSITION COATING COMPOSITION

[75] Inventors: Koji Hirano; Hiroshi Inoue; Shinji Miyatake; Masahiro Kondo, all of Hiratsuka, Japan

[73] Assignee: Kansai Paint Co., Ltd., Hyogo-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/907,079

[22] Filed: Aug. 6, 1997

[30] Foreign Application Priority Data

Aug. 6, 1996 [JP] Japan ................................. 8-207347

[51] Int. Cl.$^7$ .................................................. C08L 67/04
[52] U.S. Cl. .......................... 525/217; 525/100; 525/221; 525/222; 525/223; 526/270; 526/279
[58] Field of Search ....................................... 526/270, 279; 525/217, 222, 221, 223

[56] References Cited

U.S. PATENT DOCUMENTS 4,916,254  4/1990  Watanabe et al. ....................... 560/185
4,980,409  12/1990 Harakawa .............................. 524/510

FOREIGN PATENT DOCUMENTS 62-24519  5/1987  Japan .
2-55871  10/1990  Japan .

*Primary Examiner*—Fred Zitomer
*Attorney, Agent, or Firm*—Fisher, Christen & Sabol

[57] ABSTRACT

An anionic electrodeposition coating composition containing, as the heat curable resin components, (A) a water-dispersible vinyl copolymer having hydroxyl group, carboxyl group and an ester linkage modified by a lactone group compound and (B) a crosslinking agent.

1 Claim, No Drawings

ANIONIC ELECTRODEPOSITION COATING COMPOSITION

BACKGROUND OF THE INVENTION (1) Field of the Invention

The present invention relates to an anionic electrodeposition coating composition capable forming a film having good finish appearance and good film performances.

(2) Description of the Background Art

The anodized aluminum material has widely been used in the field of building materials such as a sash because of being lightweight, having high strength and high resistance to corrosion. The anodized aluminum material has also been coated with a matte electrodeposition coating film to produce a steady feeling.

Japanese Patent Publication No.24519/87 and Japanese Laid-Open Patent Application No.255871/90 disclose electrodeposition coating compositions capable of forming a matte film. However, the above coating compositions have poor storage stability and have such drawback that a film formed therefrom has poor film performances in matte film appearance, mortar resistance, acid resistance, alkali resistance, fabricating properties, etc.

SUMMARY OF THE INVENTION

It is an object of the present invention to provide an anionic electrodeposition coating composition which has good storage stability and is capable of forming a film having good film performances in matte film appearance, mortar resistance, acid resistance, alkali resistance, fabricating properties, etc.

That is, the present invention provides an anionic electrodeposition coating composition containing, as the heat curable resin components, (A) a water-dispersible vinyl copolymer having hydroxyl group, carboxyl group and an ester linkage modified by a lactone group compound and (B) a crosslinking agent.

DETAILED DESCRIPTION OF THE INVENTION

The copolymer(A) used in the coating composition of the present invention is a water-dispersible vinyl copolymer having an acid value of about 15 to 150 and a hydroxy value of about 30 to 200, and preferably has a weight average molecular weight of about 10000 to 200000. When the acid value is less than about 15, water-dispersibility is reduced, resulting in that the coating composition show poor storage stability. On the other hand, when more than about 150, a resulting film shows poor properties in mortar resistance, etc. When the hydroxy value is less than about 30, curing properties are reduced. On the other hand, when more than about 200, a large amount of unreacted hydroxyl group may remain in the film, resulting in making durability poor. A weight average molecular weight less than about 10000 results poor storage stability of the coating composition, and poor film properties in weather resistance, mortar resistance, etc. On the other hand, when more than about 200000, the film shows poor film properties in smoothness, etc.

The water-dispesible vinyl copolymer(A) may include, for example, a copolymer obtained by subjecting a hydroxyl group-containing vinyl monomer, carboxyl group-containing vinyl monomer, lactone-modified vinyl monomer and optionally other unsaturated monomer to radical copolymerization reaction, and the like. A lactone-modified vinyl monomer containing hydroxyl group may be used as a hydroxyl group-containing vinyl monomer. A lactone-modified vinyl monomer containing carboxyl group may be used as a carboxyl group-containing vinyl monomer.

In the case where the coating composition of the present invention is used as a matte coating composition, the matte coating composition may be obtained by using a alkoxysilyl group-containing vinyl monomer as a monomer component.

Examples of the above monomers may include the following (1) to (6).

(1) Hydroxyl group-containing lactone-modified vinyl monomers: for example, reaction products of the following hydroxyl group-containing vinyl monomers with a lactone group compound such as β-propiolactone, dimethylpropiolactone, butyrolactone, γ-valerolactone, γ-caprolactone, γ-caprilolactone, γ-laurylolactone, ε-caprolactone, δ-caprolactone and the like, and the like, caprolactone-modified (meth) acrylic hydroxyesters all marketed by Daicel Chemical Industries, Ltd. under the trade names such as Placcel FM1, Placcel FM2, Placcel FM3, Placcel FA1, Placcel FA2, Placcel FA3 and the like.

(2) Hydroxyl group-containing vinyl monomers other than the above (1): for example, hydroxyethyl (meth)acrylate, hydroxypropyl (meth)acrylate, hydroxybutyl (meth) acrylate, (poly)ethylene glycol mono(meth)acrylate, (poly)propylene glycol mono(meth)acrylate, hydroxybutyl vinyl ether, (meth)allyl alcohol and the like.

(3) Carboxyl group-containing lactone-modified vinyl monomers: for example, adducts of hydroxyl group-containing lactone-modified vinyl monomers as in the above (1) with acid anhydrides such as maleic anhydride, succinic anhydride, tetrahydrophthalio anhydride, trimellitic anhydride, phthalic anhydride and the like, and the like, caprolactone-modified carboxyl group-containing (meth)acrylic monomers all marketed by Daicel Chemical Industries, Ltd. under the trade names such as Placcel FM1A, Placcel FM4A, Placcel FM10A and the like.

(4) Carboxyl group-containing vinyl monomers other than the above (1): for example, (meth)acrylic acid, maleic acid and the like.

(5) Alkoxysilyl group-containing vinyl monomers: for example, γ-(meth)acryloxypropyltrimethoxysilane, γ-(meth)acryloxypropylmethyldimethoxysilane, γ-(meth) acryloxypropyltriethoxysilane, vinyltrimethoxysilane and the like.

(6) Other unsaturated monomers: for example, $C_{1-18}$ alkyl or cycloalkyl esters of (meth)acrylic acid such as methyl (meth)acrylate, ethyl (meth)acrylate, propyl (meth) acrylate, butyl (meth)acrylate, hexyl(meth)acrylate, octyl (meth)acrylate, lauryl (meth)acrylate, cyclohexyl (meth) acrylate and the like, (meth)acrylic amides and derivatives thereof such as (meth)acrylic amide, N-butoxymethyl (meth)acrylic amide, N-methylol (meth) acrylic amide and the like, (meth)acrylonitrile compounds and the like.

Mixing amounts of the above monomers are desirably such that the hydroxyl group-containing monomers as in the above (1) and (2) may be used in such an amount that a hydroxy value of the copolymer (A) may be in the range of about 30 to 200, and a total amount of the above monomers (1) and (2) is in the range of about 3 to 40% by weight, preferably about 5 to 30% by weight relative to a total amount of the above monomers (1) to (6), and that the above monomers (1) may be used in the range of about 1 to 100% by weight, preferably about 3 to 90% by weight relative to a total monomer amount of the above (1) and (2). Use of the above monomers (1) in an amount less than about 1% by weight reduces storage stability of the coating composition, and film appearance and properties, for example, matte film appearance, mortar resistance, etc.

The carboxyl group-containing monomers as in the above (3) and (4) may be used in such an amount that an acid value of the copolymer (A) may be in the range of about 15 to 150, and a total amount of the above monomers (3) and (4) is in the range of about 2 to 23% by weight, preferably about 4 to 10% by weight, relative to a total amount of the above monomers (1) to (6), and the above monomers (3) may be used in the range of about 0(zero) to 100% by weight, preferably about 0(zero) to 90% by weight relative to a total monomer amount of the above (3) and (4).

As above explained, the alkoxysilyl group-containing vinyl monomers (5) are used in the case where a matte film is required. A mixing amount of the monomers (5) is in the range of about 0.2 to 10% by weight, preferably about 0.5 to 5% by weight relative to a total monomer amount of the above monomers (1) to (6).

The other unsaturated monomers (6) may preferably include $C_{1-18}$ alkyl or cycloalkyl esters of (meth)acrylic acid, and aromatic vinyl monomers such as styrene. A mixing amount of the monomers (6) is in the range of about 37 to 95% by weight, preferably about 60 to 91% by weight relative to a total monomer amount of the above (1) to (6).

The radical copolymerization reaction of the above monomers (1) to (6) may be carried out by the known solution polymerization process, etc.

The water-dispersible vinyl copolymer (A) may also include, in addition to the above ones, ones prepared by a process which comprises subjecting the above monomers (2), (3) and/or (4), optionally (5) and (6) to radical copolymerization reaction to obtain a vinyl copolymer containing hydroxyl group and carboxyl group, followed by carrying out a known addition reaction between hydroxyl group in the resulting copolymer and the above lactone group compound.

The crosslinking agent (B) used in the coating composition of the present invention reacts with hydroxyl group of the water-dispersible vinyl copolymer (A) to form a cured film. The crosslinking agent (B) may include melamine resin, block polyisocyanate compound, etc. as known in the art.

The melamine resin crosslinking agent may include, for example, ones by modifying at least a part of methylol groups in the melamine resin with at least one alcohol such as methanol, ethanol, propanol, butanol, octyl alcohol, 2-ethylhexyl alcohol and the like. The melamine resin may preferably contain at least 50% by weight of mononuclear to polynuclear, ie. about pentanuclear ones. The melamine resin may also contain functional groups such as imino group, methylol group, etc.

The block polyisocyanate crosslinking agent may include, for example, ones prepared by blocking an aliphatic or alicyclic polyisocyanate compound such as isophorone diisocyanate, hexamethylene diisocyanate and the like by lactones such as ε-caprolactone, and alcohols such as propanol, butanol, pentanol, benzyl alcohol and the like.

A mixing ratio between the water-dispersible vinyl copolymer (A) and the crosslinking agent (B) is such that the water-dispersible vinyl copolymer (A) is in the range of 40 to 85% by weight, preferably 50 to 80% by weight, and the crosslinking agent (B) is in the range of 15 to 60% by weight, preferably 20 to 50% by weight based on a total weight of the copolymer (A) and the crosslinking agent B. When the amount of the water-dispersible vinyl copolymer (A) is less than 40% by weight and that of the crosslinking agent (B) is more than 60% by weight, the resulting film shows poor film performances in weather resistance, mortar resistance, fabricating properties, etc. On the other hand, when the amount of the copolymer (A) is more than 85% by weight and that of the crosslinking agent (B) is less than 15% by weight, the resulting film shows poor film performances in weather resistance, fabricating properties, etc.

The coating composition of the present invention may optionally contain pigments, dyes, curing catalyst, flowability regulating agent, etc.

The coating composition of the present invention may be prepared, for example, by mixing the copolymer (A) with a mentralizing agent such as diethylamine, triethylamine and the like in an amount of 0.3 to 0.5 equivalent relative to carboxyl group of the copolymer (A), followed by adding the crosslinking agent (B) to be dispersed, dispersing into water, and by controlling a PH of the coating composition to be 7.0 or higher.

The coating composition of the present invention is preferably applicable to the field of aluminum building materials, in which pigmented or unpigmented anodized aluminum materials are used.

The coating composition of the present invention is preferably used as a matte coating composition.

A coating method of the coating composition in the present invention comprises, for example, subjecting the coating composition to forming an anionic electrodeposition coating bath having a solid content of about 5 to 20% by weight, preferably about 6 to 12% by weight, followed by dipping an aluminum material into the bath, carrying out an anionio electrodeposition coating to be a dry film thickness of about 5 to 30 μm, preferably washing with a tap water, a permeated water or the like, and by heat curing at about 160 to 200° C. for about 20 to 40 minutes.

The coating composition of the present invention can provide such remarkable effects that the coating composition has good storage stability and the resulting film shows good film performances in mortar resistance, fabricating properties, etc., because the water-dispersible vinyl copolymer containing hydroxyl group and carboxyl group contains an ester linkage due to the lactone group compound.

The present invention is explained more in detail by the following Examples. The present invention should not be limited to the following Examples.

Preparation Example of Copolymer (a)

A reactor was charged with 55 g of isopropyl alcohol and kept at 80° C., followed by dropping a mixture of 10 g of styrene, 33 g of methyl methacrylate, 10 g of n-butyl acrylate, 10 g of ethyl acrylate, 5 g of 2-hydroxyethyl acrylate, 7 g of acrylic acid, 25 g of Placcel FM3 (Marketed by Daicel Chemical Industries, Ltd., trade name, caprolactone-modified (meth)acrylic acid hydroxyesters, and so forth) and 2 g of azobisdimethylvaleronitrile over 3 hours, adding 1(one) g of azobisdimethylvaleronitrile, and reacting at 80° C. for one hour to prepare a copolymer (a) varnish. The resulting copolymer had a weight average molecular weight of about 20000, an acid value of 55 and a hydroxy value of 54.

Preparation Example of Copolymer (b)

A reactor was charged with 55 g of isopropyl alcohol and kept at 80° C., followed by dropping a mixture of 10 g of styrene, 30 g of methyl methacrylate, 25 g of n-butyl acrylate, 10 g of 2-hydroxyethyl acrylate, 5 g of acrylic acid, 20 g of Placcel FM4A (Marketed by Daicel Chemical Industries Ltd., trade name, caprolactone-modified carboxyl group-containing acrylic monomer) and 2 g of azobisdimethylvaleronitrile over 3 hours, adding 1(one)g of azobisdimethylvaleronitrile, and reacting at 80° C. for one hour to prepare a copolymer (b) varnish. The resulting copolymer had a weight average molecular weight of about 20000, an acid value of 55 and a hydroxy value of 48.

Preparation Example of Copolymer (c)

A reactor was charged with 55 g of isopropyl alcohol and kept at 80° C., followed by dropping a mixture of 10 g of styrene, 32 g of methyl methacrylate, 10 g of n-butyl acrylate, 10 g of ethyl acrylate, 15 g of 2-hydroxyethyl acrylate, 5 g of acrylic acid, 15 g of Placcel FM3, 3 g of γ-methacryloxypropyltrimethoxysilane, and 1(one)g of azobisdimethylvaleronitrile over 3 hours, adding 1(one)g of azobisdimethylvaleronitrile, and reacting at 80° C. for one hour to prepare a copolymer (c) varnish. The resulting copolymer had a weight average molecular weight of about 50000, an acid value of 39 and a hydroxy value of 90.

Preparation Example of Copolymer (d)

A reactor was charged with 55 g of isopropyl alcohol and kept at 800, followed by dropping a mixture of 10 g of styrene, 31 g of methyl methacrylate, 10 g of n-butyl acrylate, 30 g of ethyl acrylate, 12 g of 2-hydroxyethyl acrylate, 7 g of acrylic acid, and 2 g of azobisdimetylvaleronitrile over 3 hours, adding 1(one)g of azobisdimethylvaleronitrile, and reacting at 80° C. for one hour to prepare a copolymer (d) varnish. The resulting copolymer had a weight average molecular weight of about 20000, an acid value of 55 and a hydroxy value of 58.

Preparation Example of Copolymer (e)

A reactor was charged with 55 g of isopropyl alcohol and kept at 80° C., followed by dropping a mixture of 10 g of styrene, 30 g of methyl methacrylate, 3 g of n-butyl acrylate, 30 g of ethyl acrylate, 19 g of 2-hydroxyethyl acrylate, 5 g of acrylic acid, 3 g of γ-(meth)acryloxypropyltrimethoxysilane, and 1(one)g of azobisdimethylvaleronitrile over 3 hours, adding 1(one)g of azobisdimethylvaleronitrile, and reacting at 80° C. for one hour to prepare a copolymer (e) varnish. The resulting copolymer had a weight average molecular weight of about 50000, an acid value of 39 and a hydroxy value of 92.

EXAMPLE 1

To 70 g (as the solid content) of the above copolymer (a) was added triethylamine in an amount of 0.4 equivalent to carboxyl group of the copolymer (a), followed by mixing and dispersing, adding 30 g of Cymel 303(Marketed by Mitsui Cytec Ltd., trade name, methoxyfied melamine resin), mixing and dispersing, slowly dropping deionized water with agitation, and adding triethylamine so that the PH may be 7.0 to prepare an electrodeposition coating composition having a solid content of 10% by weight.

EXAMPLE 2

Procedures of Example 1 were duplicated except that the copolymer (b) was used in place of the copolymer (a) to prepare an electrodeposition coating composition.

EXAMPLE 3

Procedures of Example 1 were duplicated except that the copolymer (c) was used in place of the copolymer (a) to prepare an electrodeposition coating composition.

Comparative Examples 1

Procedures of Example 1 were duplicated except that the copolymer (d) was used in place of the copolymer (a) to prepare an electrodeposition coating composition.

Comparative Examples 2

Procedures of Example 1 were duplicated except that the copolymer (e) was used in place of the copolymer (a) to prepare an electrodeposition coating composition.

Into an electrodeposition coating bathes consisting of the electrodeposition coating compositions obtained in Examples and Comparative Examples as above were dipped 150×70×0.5 mm size test panels of an anodized aluminum material (simply referred to as Al in the following Table 1) having a film thickness of about 10 µm and of a zinc phosphate-treated steel sheet (simply referred to as Fe in the following Table 1), followed by carrying out electrodeposition coating to be a dry film thickness of about 10 µm, taking the test panels out of the bath, carrying out setting for about 10 minutes, and heat curing at 160° C. for 30 minutes to coat clear films of Examples and Comparative Examples respectively.

Results are shown in Table 1.

TABLE 1

|  | Example | | | Comparative Example | |
| --- | --- | --- | --- | --- | --- |
|  | 1 | 2 | 3 | 1 | 2 |
| Coating composition storage stability | 4 | 4 | 4 | 3 | 1 |
| Test panels | Al | Fe | Al | Al | Al Fe | Al |
| Specular reflection percentage | 98 | 95 | 99 | 10 | 88 80 | 24 |
| Film smoothness | 4 | 4 | 4 | 4 | 3 3 | 2 |
| Matte film appearance |  |  |  | 4 |  | 2 |
| Erichsen test | 4 | 4 | 4 | 4 | 2 1 | 2 |
| Mortar resistance | 4 | 4 | 4 | 4 | 1 2 | 1 |
| Acid resistance | 4 | 3 | 4 | 4 | 2 1 | 2 |
| Alkali resistance | 4 | 4 | 3 | 4 | 1 2 | 1 |
| Corrosion resistance | 4 | 3 | 4 | 4 | 2 1 | 2 |

Storage Stability of Coating Composition

A coating composition was filled in a test tube having a height of 20 cm and a volume of 20 ml, followed by leaving at rest at 20° C. for 7 days to examine a height of residue precipitated at the bottom of the test tube. Evaluation was carried out as follows. 4: Very good, less than 0.5 mm; 3: Good, 0.5 mm or more but less than 5 mm; 2: Poor, 5 mm or more but less than 10 mm; 1: Very poor, 10 mm or more.

Film Performance Test Methods

Specular Reflection Percentage

A 60° specular reflection percentage defined in JIS K 5400 was measured.

Film Smoothness

The surface of a film was visually evaluated from the standpoints of orange peel, unevenness, etc. as follows. 4: Very good, 3: Good, 2: Poor, 1: Very poor.

Matte Film Appearance

Finish appearance on the film surface was visually examined of gloss unevenness etc. to evaluate as follows. 4: Very good, 3: good, 2: poor, 1: very poor.

Erichsen test

A film of a coated panel was crosscut to such a depth as to reach a base material to form 100 squares, followed by pushing out the coated panel by 5 mm from a back side of the coated film by use of a Erichsen tester to examine film appearance. Evaluation was made as follows. 4: Film shows nothing abnormal, 3: film shows one abnormal point, 2: film shows 2–5 abnormal points, 1: film shows 6 or more abnormal points.

Mortar resistance

A crosscut test panel was dipped into a mortar prepared by mixing cement, sea sand and water in a weight ratio of 1:3:0.5 at 50° C. for 7 days, followed by separating the test panel from the mortar to examine of film abnormalities such as gloss reduction, blistering, peeling and the like. 4: Very good and no film abnormalities, 3: good, 2: poor, 1: very poor.

Acid resistance

A test panel was dipped into a 5 wt % aqueous hydrochloric acid solution at 20° C. for 72 hours to examine film appearance. 4: Very good and no abnormalities, 3: good, 2: development of some blisters, 1: development of a large amount of blisters.

Alkali resistance

A test panel was dipped into a 1(one)wt % aqueous caustic soda solution at 20° C. for 72 hours to examine film appearance. 4: Very good and no abnormalities, 3: good, 2: development of some blisters, 1: development of a large amount of blisters.

Corrosion resistance

A test panel crosscut so as to reach a base material was subjected to a salt spray test according to JIS K- 5400. 4: Very good and no abnormalities, 3: having a corroded width less than 1.0 mm measured from the out portion, 2: having a corroded width of 1.0 mm or more but less than 2.0 mm, 1: having a corroded width of 2.0 mm or more.

What is claimed is:

1. An anionic electrodeposition matte coating composition containing, as the heat curable resin components, (A) a water-dispersible vinyl copolymer obtained by subjecting a hydroxyl group-containing vinyl monomer, a carboxyl group-containing vinyl monomer, a lactone-modified vinyl monomer containing a hydroxyl group and/or a carboxyl group and an alkoxysilyl group-containing vinyl monomer as essential monomer components to radical copolymerization, and having an acid value of 15 to 150, a hydroxy value of 30 to 200, an ester linkage modified by a lactone group compound and an alkoxysilyl group on its side chain, and (B) a melamine resin crosslinking agent, said water-dispersible vinyl copolymer (A) being in the range of 40 to 85% by weight, and said crosslinking agent (B) being in the range of 15 to 60% by weight based on a total weight of the copolymer (A) and the crosslinking agent (B).

* * * * *